United States Patent
Santosuosso et al.

(10) Patent No.: US 6,701,520 B1
(45) Date of Patent: Mar. 2, 2004

(54) PREVENTING GARBAGE COLLECTION OF OBJECTS IN OBJECT ORIENTED COMPUTER PROGRAMMING LANGUAGES

(75) Inventors: John Matthew Santosuosso, Rochester, MN (US); Eric Lawrence Barsness, Pine Island, MN (US)

(73) Assignee: International Business Machines Corporation, Armonk, NY (US)

(*) Notice: Subject to any disclaimer, the term of this patent is extended or adjusted under 35 U.S.C. 154(b) by 0 days.

(21) Appl. No.: 09/309,843

(22) Filed: May 11, 1999

(51) Int. Cl.[7] .................................................. G06F 9/45
(52) U.S. Cl. ........................ 717/152; 707/206; 717/140; 717/153; 717/116
(58) Field of Search .................................. 707/206, 103, 707/104; 717/5, 9, 140, 152, 153, 116

(56) References Cited

U.S. PATENT DOCUMENTS

| | | | | |
|---|---|---|---|---|
| 4,853,842 A | * | 8/1989 | Thatte et al. | 707/206 |
| 5,845,298 A | * | 12/1998 | O'connor et al. | 707/206 |
| 5,960,087 A | * | 9/1999 | Tribble et al. | 380/49 |
| 6,003,038 A | * | 12/1999 | Chen | 707/103 |
| 6,098,089 A | * | 8/2000 | O'connor et al. | 709/104 |
| 6,138,127 A | * | 10/2000 | Pasch | 707/206 |
| 6,317,872 B1 | * | 11/2001 | Gee et al. | 717/151 |
| 6,321,240 B1 | * | 11/2001 | Chilimbi et al. | 707/206 |
| 6,434,575 B1 | * | 8/2002 | Berry et al. | 707/206 |

OTHER PUBLICATIONS

Garbage Collection, Richard Jones © 1996, p. 3,8,115, 126, 231–232,249,254,288–289.*
Sagar, Ajit, "The Java Programming Language Trade–offs", JAVA Developer's Journal, vol. 3, Issue 11, pp. 18–22 (1998).

* cited by examiner

Primary Examiner—Tuan Dam
Assistant Examiner—Chuck Kendall
(74) Attorney, Agent, or Firm—Karuna Ojanen; James R. Nock

(57) ABSTRACT

A method to improve object-oriented computer processing by reducing the incidences of object creation and garbage collection. A compiler, preferably of object-oriented language such as Java, identifies a list of objects that are fixed in value or are constant and places those fixed/constant objects in a separate class, a root class, which is loaded at run-time along with all the other classes. Upon creation of an object table, a separate object table may be created for those objects in the root class thereby immunizing the fixed entries from garbage collection and the values will not be erased from memory. Alternatively, the fixed/constant objects can be placed in an object table along with other variable objects but can be marked as active by changing the bit values in a field of the object table. In any event, first objects that are fixed in value are not created each time the object is called; and second, the values of those objects will not be discarded from memory because they are immune from garbage collection by manipulation of object tables or by fields within the object tables.

14 Claims, 4 Drawing Sheets

PREVENTING GARBAGE COLLECTION OF OBJECTS IN OBJECT ORIENTED COMPUTER PROGRAMMING LANGUAGES

TECHNICAL FIELD

The present invention relates generally to the field of computer data processing, and more particularly to immunizing objects from garbage collection in object oriented programming, such as Java.

BACKGROUND OF THE INVENTION

Computer programming is the method by which humans tell computers how to perform a specific task; it typically comprises lists of instructions on how to retrieve, manipulate and store data. Previously, programming was procedural or step-by-step, that is, a programmer would tell the computer to fetch data A from space A and then fetch data B from space B and then add A+B and then store the answer in space C. For the most part, computers still require those instructions but the level of sophistication has increased. One type of programming, known as object-oriented programming (OOP), is becoming increasingly popular and may eventually supplant procedural programming. OOP languages, such as Smalltalk, C++, and Java, allow programmers to approach their programming tasks in a more natural and intuitive way than the rigidity of the procedural programming languages. The goal of OOP is to reduce the time and costs associated with developing complex software by creating small, reusable sections of program code that can be quickly and easily combined and reused to create new programs. The executable code sections and the data contained therein are known as objects. The software object may model the attributes or characteristics of the real-world object and, in many cases, may also model its behavior. For example, an OOP employee object may have certain attributes of a real employee, such as a name, an address, an employee number, and so forth. Exploiting the full capabilities of the OOP source code, the employee object could be used in a program corresponding to the way one would interact with a real employee. For instance, the employee object could provide the employee's address when asked for that information or provide the employee's status, e.g., "on vacation," when asked for status information. Object-oriented databases (OODBs) that are specifically designed to facilitate storage and retrieval of objects have been developed. Objects that are stored in a data store are known as persistent objects because they "persist" after the program that created them ceases executing.

Java™ is a programming language that blossomed in the mid to late 1990s. The concept of Java was to remove software dependence on individual processors and into the realm of consumers, i.e., despite the fanaticism towards certain computer processors and operating systems exhibited by those knowledgeable in the computer industry, most consumers of electronic devices are irreverent when it comes to which particular processor or operating system is used to operate or function on their consumer electronic device so long as it works reliably and seamlessly. So, Java was initially developed for "smart" consumer electronic devices that could all be centrally controlled and programmed from a handheld remote control device, such as using the same software to operate a set-top box for video-on demand technology or a toaster. Java has flourished with burgeoning expansion of network computer technology and the rise of the world wide web browsing technology to facilitate access to the Internet. Java applications can then be written on one computer and transferred over a network, such as the world wide web, to any other consumer electronic device, such as another computer, that has a Java compiler or interpreter regardless of the operating system or the processor in that consumer electronic device.

One of the reasons Java is so productive and accepted is that Java doesn't require the programmer to manage memory deallocations, i.e., garbage collection is automatic and is done "under the covers." In a pure Java program there's no such thing as a memory leak that exists in C/C++ and other languages. A memory leak occurs when memory is allocated but not deallocated after the memory is unreachable by the program. Memory is allocated at instantiation of an object. The purpose of garbage collection is to automatically reclaim memory from objects that are no longer referenced. While this is a nice scheme that makes programming easier and less prone to errors, the programmer has no absolute control over when the garbage collector runs other than to manipulate some parameters, e.g., the minimum and maximum garbage collection size and the frequency with which garbage collection is done. The garbage collector typically runs periodically at the discretion of the Java Virtual Machine (JVM). Different virtual machines support different strategies for garbage collection. The bottom line is that memory is reclaimed when there are no longer any references to an object.

Garbage collection works well in most programming situations. Lack of control over memory deallocations, however, sometimes presents problems. Two problems relating to garbage collection occur in memory-constrained and real-time applications. Because the programmer has no control over exactly when memory is released, applications that are severely memory-constrained will have to rely on the garbage collector to free up memory fast enough so that no significant performance penalties have to be paid. This is typically not a problem as garbage collection algorithms are well known in the art and are usually very efficient.

In real-time applications, however, garbage collection consumes substantial system resources when its runs. In these real-time applications timing is critical and the slowdown caused by garbage collection may not be acceptable. Because there is no way to predict precisely when the memory is going to be freed, i.e., when the garbage collector is going to be activated, finding a work around is a daunting task. The Java Runtime class provided a method gc( ) to facilitate garbage collection. A call to gc( ) may be made as follows:

// Tell the garbage collector to free up memory
System.gc( );

Calling gc( ), however, doesn't deallocate memory; it is merely a suggestion to the virtual machine to run the garbage collector as soon as it can. When the garbage collector actually runs depends on the runtime environment and the implementation of the garbage collector.

Garbage collection is based on determining when an object in the runtime process is no longer in use. JVMs generate and maintain a list or table of objects contained within the JVM. As long as an active reference is in the object table, the object is reachable by the program. During the garbage collection process, the object table or list of objects is partitioned into two components: (1) active or live components; and (2) inactive objects that are no longer referenced or are dead. An object can be marked as inactive or dead so long as no other references still point to the object. Once marked as inactive, the memory can be reclaimed.

A technique for finer grain of control for Java program's interaction with the garbage collection is Reference Object Application Programming Interface (API). The reference object encapsulates a regular reference to a Java object. The API defines the following reference types: soft reference, weak reference, and phantom reference in order of reachability. The impact on garbage collection is that the weaker the reference the more the incentive for the garbage collector to free its memory. Creating appropriate references using the Reference Object API gives the programmer more control over what memory is freed by the garbage collector but there is still no disclosed way to prevent constant objects from being reclaimed.

There remains a need, however, to improve two critical aspects of the Java environment: object creation and garbage collection. It is thus an object of the invention to reduce the amount of object creation and garbage collection that occurs in JVMs running Java applications.

SUMMARY OF THE INVENTION

These and other objects of the invention are achieved by a method of object-oriented processing which removes the creation of constant or immutable objects from method calls by elevating those objects to a static class variable. A private mutable object variable may also be elevated. These elevated objects are then stored in a root class. From the root class, a second immune object table may be created having a plurality of fixed entries, each corresponding to a respective one of the elevated objects wherein the garbage collector does not collect any of the fixed entries in the immune object table. Alternatively, elevated objects may correspond to a fixed entry in an object table and each of the respective fixed entries are marked as being immune from garbage collection.

The invention may further be realized in a method of object oriented computer processing, comprising the steps of: compiling object oriented computer code and determining if there are any fixed objects in said object oriented code. If there are fixed objects, then the method elevates them to static class variables and places them in a separate root class. A separate immune object table having a number of entries, each corresponding to one of the static class variables in the root class is created and maintained. The immune object table is then immune from garbage collection thereby retaining the values of the static class variables. Alternatively, the static class variables are maintained in an object table having all objects created by the object oriented code, but are marked as always being immune form garbage collection to retain their values.

The invention is further envisioned as an apparatus for object oriented computing, comprising means for compiling object oriented source code, means for determining if any of the objects created by the source code have constant values, and means for elevating those objects having constant values to a separate root class. The invention also has means for indicating the objects in said root class to be immune from garbage collection during execution of said source code. The indicating means may comprise means for storing the objects in the root class in an immune object table separate from an object table having variable objects; or may comprises means for fixedly marking the elevated objects in an object table to be immune from garbage collection.

It is preferred that such object-oriented code be Java. It is also preferred that such elevated objects comprise immutable objects provided by the computer programming language, private mutable object variables, and user-define immutable objects.

The invention will further be understood by reference to the Drawing in which:

DETAILED DESCRIPTION OF THE INVENTION

The invention described herein relates to a method of computer processing. As such, it is to be understood that any computer system having a processor including a compiler to convert a programmer's written instructions to code that is understandable by the machine, a memory, any number of input/output devices, and any number of network connections to other computers are capable of operating in accordance with principles of the invention.

It is also known that in programming, there are many instances wherein the values of certain parameters are constant, e.g., scientific constants such as the value of or $\pi$ the natural logarithm e; other string or character constants include "Please enter your password" and "Incorrect entry", or logical decisions such as "true" and "false", etc. In an object-oriented computer programming language those parameters which cannot change in value once they are created, except in the instance of Java via uncommon Java Native Interface (JNI) calls, are called immutable objects. Some immutable objects are provided by the computer programming language and other user-defined immutable objects are created by a programmer when writing an application. Examples of immutable objects that are common building blocks of the Java programming language and often used include String, Integer, Float, BigDecimal, BigInteger, Boolean, Byte, Char, etc.

Figure 1:
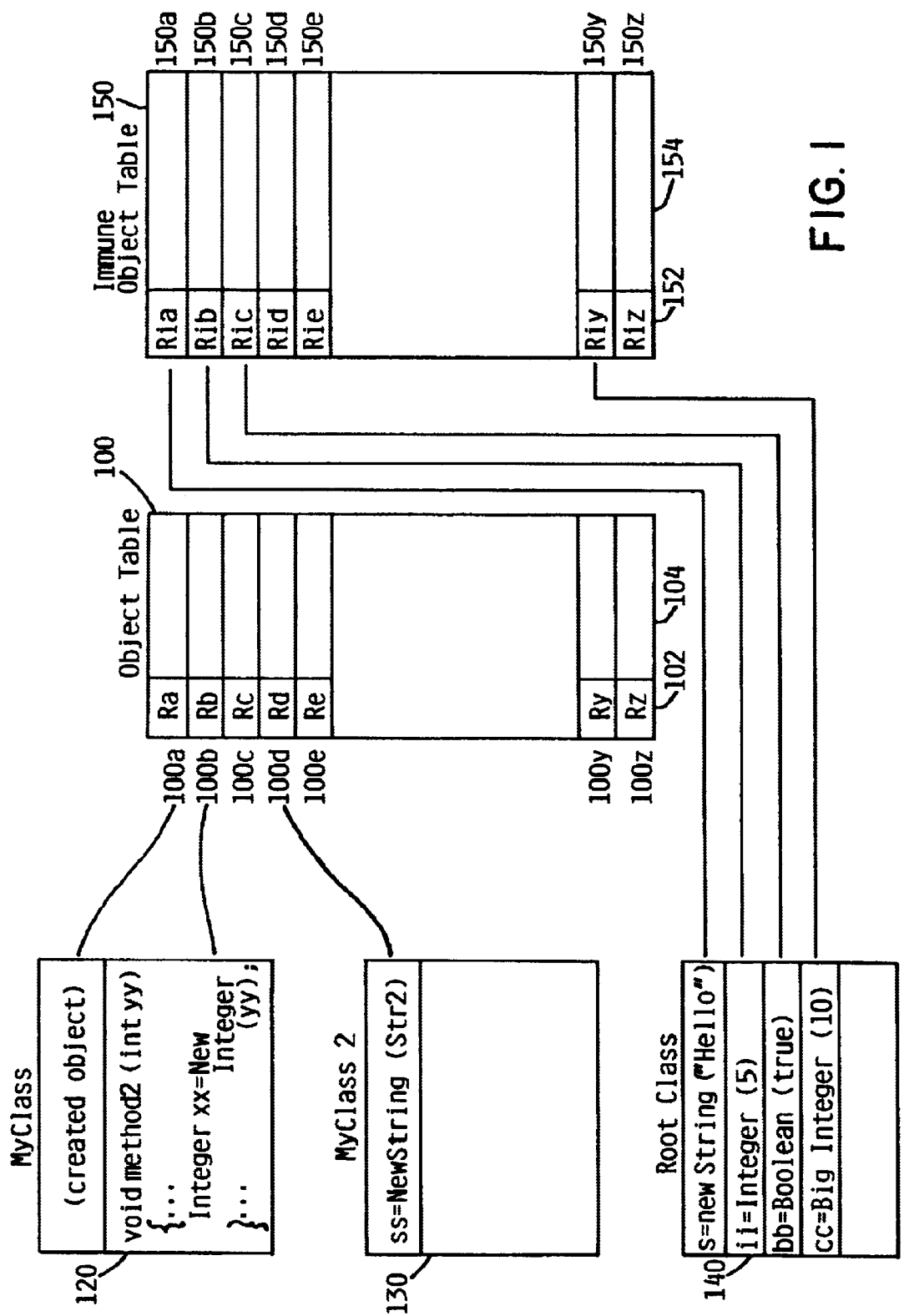
FIG. 1 is a simplified schematic of an object table and a second immune object table and the relationship of their contents to several classes according to an embodiment of the invention. It is suggested that FIG. 1 be printed on the cover of the patent.

With reference to FIG. 1, in a Java program an object table 100 is created which typically lists a plurality of entries representative of objects created by a Java application. Object table 100 has entries 100a, 100b, 100c . . . 100z, each containing a reference to an instance of an object. In the prior art, as described above, whenever an object is instantiated, the object reference is placed in an object table. Each entry in the object table 100 has a reference Ra, Rb, Rc . . . Rz as shown in the column indicated 102 to an address in memory where the object is stored. Each entry 100a, 100b, etc. in object table 100 is associated with a class which includes the line of code that instantiates that object. Thus the object in entry 100a of object table 100 is associated with a line of code in the class MyClass 120. Entry 100d of object table 100 may be associated with class MyClass2 130.

As an example, in the prior art, each and every time there is a method call to the following code, there is a creation or a "new" of an immutable object, i.e., an immutable object String is created with the contents of "Hello" or, in Java code: String s=new String("Hello").

```
public class Myclass {
    void callMe( ) {
        String s new String ("Hello");    // create string
        System.out.println(s);            // output string to screen
    }
}
```

Upon the instantiation of String s and its contents, memory is allocated. When the object goes out of scope which means that the object is not referenced in a stack frame and that no other object references the object, the first object can be marked as inactive and can be garbage collected.

According to principles of the invention applied as described herein, immutable objects created with constants, herein referred to as fixed, in Java methods are treated as class variables which allows these objects to be created only once. Thus, if a method which creates an immutable object having a constant is called multiple times or if separate threads call the method, the object is created only once no matter how many times the method is invoked. The above code is equivalent to the following:

```
public class Myclass {
    private static String s = new String ("Hello");    // create string
    void callMe( ) {
        System.out.println(s);                         // output string
                                                       // to screen
    }
}
```

In the invention described herein, the Java compiler identifies any immutable objects created with constants at compilation time and changes or "elevates" them to equivalent static class variables, resolving any name conflicts. Immutable or constant objects are objects whose internal value can be set only at creation time and a static class variable is one in which only one copy exists for all objects of that class. The act of elevation can be extended to other objects that are private and mutable object variables wherein the compiler determines that the values of the variables cannot be modified at run-time. A private object is one that can only be accessed by the class in which it is contained. These private mutable object variables, for purposes of this invention, are also considered fixed.

Because these elevated objects are not really class variables, they can be put in a class other than in their class. This alternative class is shown in FIG. 1 as the root class 140. This reassignment of the objects to the root class 140 is possible, moreover, because their elevation is hidden from any user code. Thus, by way of example only, root class 140 contains the code which instantiates each of the constant objects: s=new String ("Hello"); ii=Integer (5); bb=Boolean (true); cc=BigInteger (10). Reassignment of constant objects can be done for all the aforementioned objects so long as the object is not passed to a JNI routine that could potentially modify the value.

Because these objects need only be created once, moreover, these objects can be removed from participation in the garbage collection process, further speeding up the execution of Java applications. When a class is loaded by the JVM, the root class 140 is also loaded but no entry for it is created in the object table 100 to keep the garbage collector from seeing the elevated objects in the root class. This means that the normal garbage collection process does not see these objects because it is not allowed to trace the location containing the elevated objects, thus making those entries immune from garbage collection.

Instead when calls are made to the root class140, the instantiated constant objects are maintained in a second object table 150 whose contents are these constants. The second object table, called the immune or constant object table 150, is similar to object table 100 in that it has a plurality of entries 150a, 150b, 150c, . . . 150z, each having a respective reference to an address in memory, Ria, Rib, Ric, . . . Riz.

Figure 2:
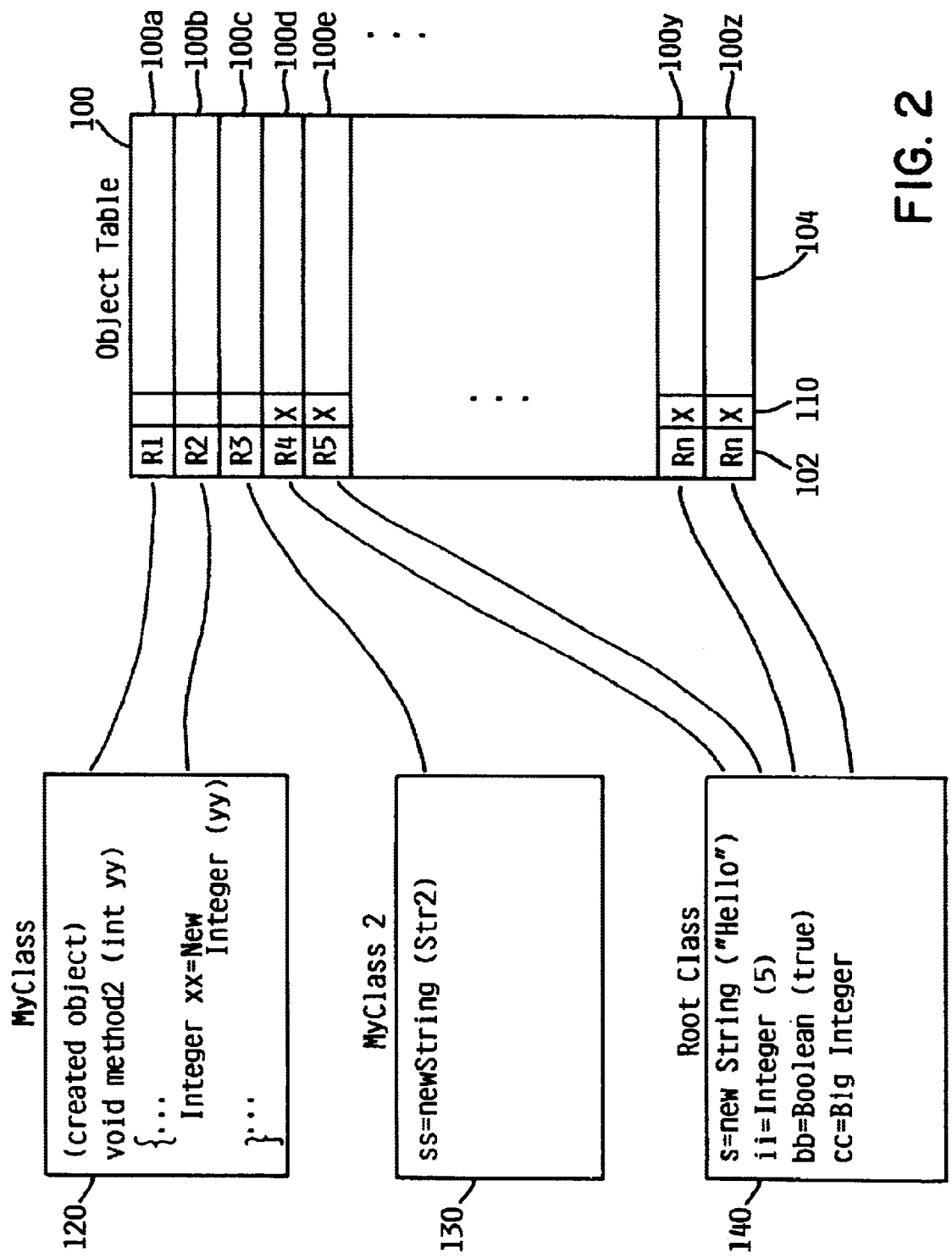
FIG. 2 is a simplified schematic of an object table and the relationship of its contents to several classes according to an embodiment of the invention.

FIG. 2 illustrates another embodiment in which constant objects are immune from garbage collection. Objects which have been elevated are stored in the root class 140 as described, but are still contained in object table 100 along with all other objects. Object table 100 has a plurality of entries 100a, 100b, 100c . . . 100z, each entry have a respective reference R1, R2, R3 . . . Rn 102 to an address in memory where that object is stored. There is a separate field, however, called the garbage collection field 110 in each entry. Upon creation, the compiler elevates these objects and marks them as active by changing bit values in the garbage collection field 110. The fixed objects marked as active are never marked inactive. If a reference to an elevated object exists within a register at the time the garbage collector runs, the object that is marked active would simply be ignored.

Figure 3:
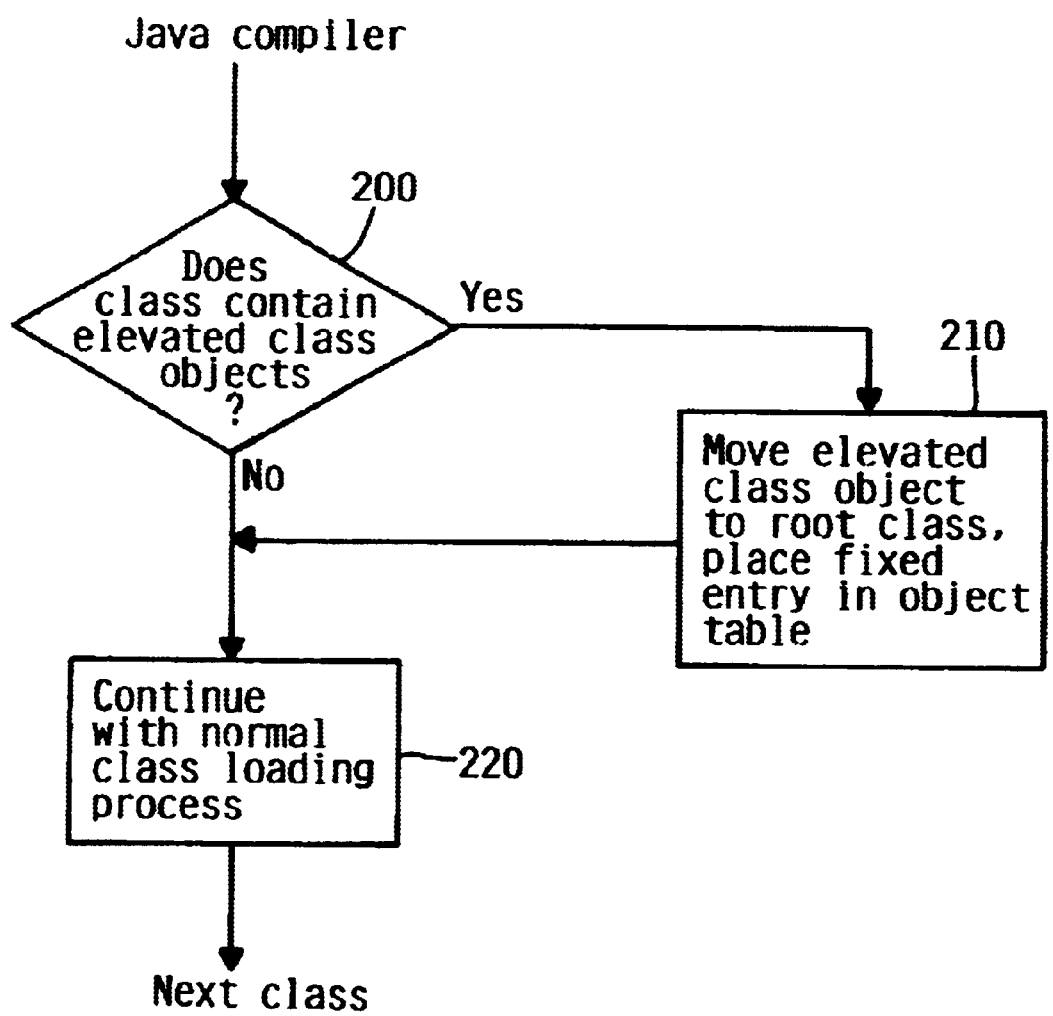
FIG. 3 is a simplified flow chart of a process to place objects in the immune object table according to principles of the invention.

FIG. 3 illustrates a simplified flow diagram of the elevation and the placement of fixed entries in the corresponding object table of the elevated objects as described above. For each class created by Java code, the Java compiler in step 200 determines if the class contains any of the elevated class objects. If so, then in step 210 those elevated class objects are moved to the root class 140. Then, as in one embodiment of the invention shown in FIG. 1, if a second immune object table is implemented, a corresponding fixed entry is created in the separate immune object table 150. If, however, according to the embodiment of the invention shown in FIG. 2, a corresponding entry is placed in the object table and it is fixed by permanently marking it as active in the garbage collection field. Thereafter the compiler continues with normal class loading procedures as in step 220 to fill in the normal object table 100 and then continues with the next class.

Figure 4:
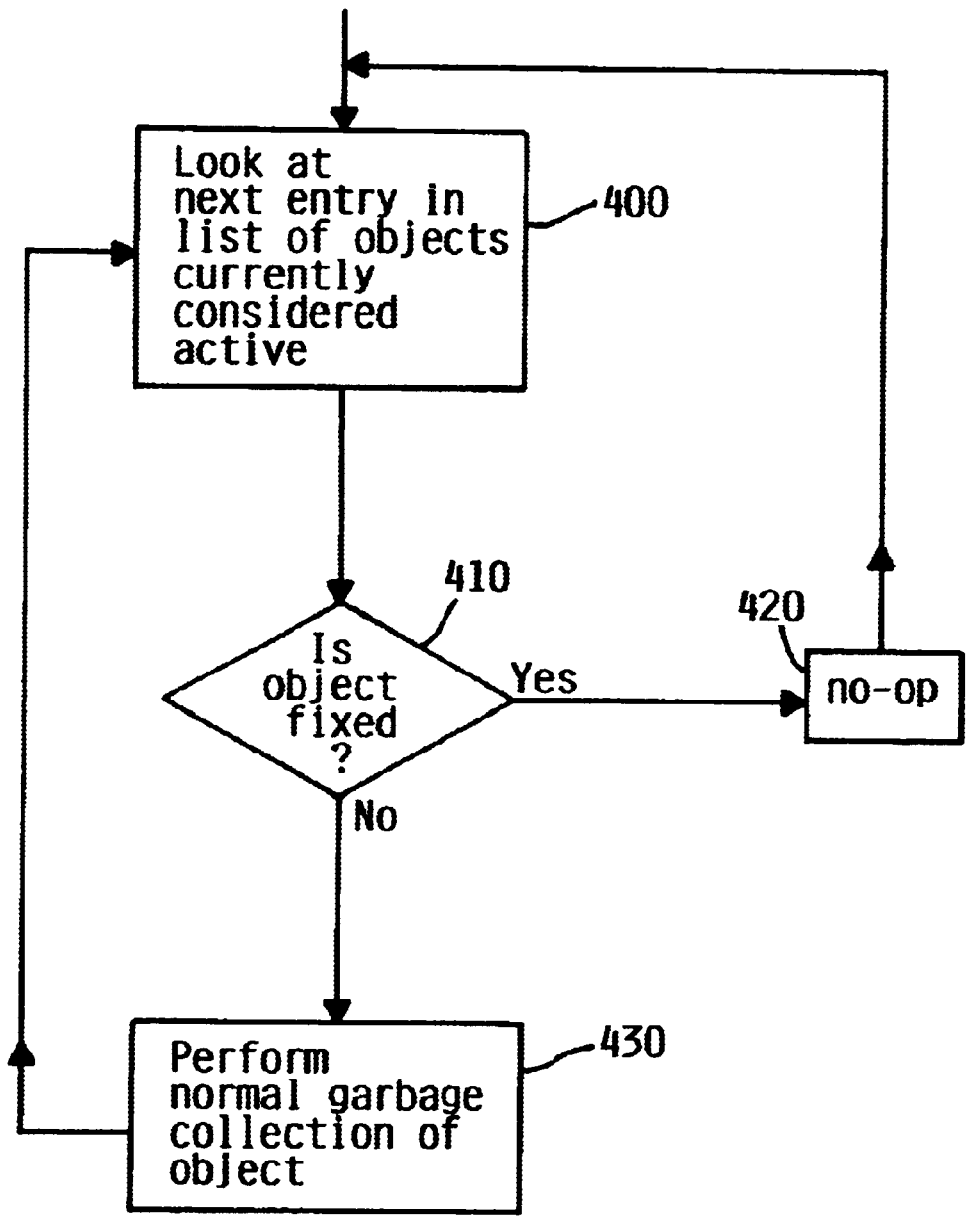
FIG. 4 is a simplified flow diagram of a method according to principles of the invention.

FIG. 4 illustrates a method of garbage collection of the object table as described in the embodiment of FIG. 2 when fixed entries corresponding to the objects of the root class are present. In step 400, the garbage collector looks at the next entry in the list of objects currently considered active. If the entry is fixed as illustrated in step 410, the garbage collector performs a no-op and does not discard or sweep that object or entry from the object table, shown in step 420. If, however, the entry is not marked, normal garbage collection occurs as in step 430.

Although a specific embodiment of the invention has been described herein in some detail, this has been done solely for the purpose of illustrating the invention in various of its aspects, and it is to be understood that the foregoing description does not limit the scope of the invention. Although the embodiment uses Java as a programming language, it is to be understood that any programming language which creates parameters having unchangeable values during the life of any part of a program may elevate those parameters so that then need be created only once. Moreover, those elevated parameters, in order to be created only once, must be protected from an automatic function to erase these values from memory, described as garbage collection in the specification herein. Specifically, in object-oriented programming, any object whose value does not change can be elevated and permanently marked as active or can be placed in an object table that is immune from garbage collection. It is contemplated that various substitutions, alterations and/or modifications to the embodiment of the invention disclosed herein, including but not limited to those implementation options specifically noted herein, may be made to the invention without departing from the spirit and scope of the invention as defined. in the appended claims.

What is claimed is:

1. A method of object-oriented computer processing, comprising the steps of:
   (a) compiling and identifying in a computer processing program any method calls that create an immutable object;
   (b) elevating the immutable object to a static class variable; and
   (c) removing creation of the immutable object during run-time computer processing of the method calls creating the immutable object.

2. The method of claim 1, further comprising the steps of:
   (a) creating a root class having each of said elevated objects;
   (b) creating an immune object table having a plurality of fixed entries, each of said fixed entries corresponding to a respective one of said elevated objects; and
   (c) preventing said fixed entries from participating in a garbage collection process.

3. The method of claim 2, wherein a private mutable variable may be one of said elevated objects.

4. A method of claim 1, further comprising the steps of:
   (a) creating a root class having each of said elevated objects;
   (b) setting up an object table; and
   (c) marking each of a plurality of fixed entries corresponding to each of said elevated objects in the object table to be prevented from participating in a garbage collection process.

5. The method of claim 4, wherein a private mutable variable may be one of said fixed entries.

6. The method of claim 1, wherein said object oriented processing is the processing of Java object oriented code.

7. The method of claim 1, wherein said static class variables comprise:
   immutable objects provided by a computer programming language in which code of said object-oriented processing is written, private mutable objects, and user-define immutable objects.

8. A method of object oriented computer processing, comprising the steps of:
   (a) compiling object oriented computer code and determining if there are any fixed objects in said object oriented code;
   (b) elevating said fixed objects to be static class variables;
   (c) removing creation of said fixed objects during run-time computer processing of method calls creating said fixed objects;
   (d) storing said static class variables in a separate root class;
   (e) creating a separate immune object table having a number of entries, each of said entries corresponding to one of said static class variables in said root class; and
   (f) making said immune object table to be prevented from participating in a garbage collection process thereby retaining the values of said static class variables.

9. The method of claim 8, wherein said object oriented computer code is Java code.

10. A method of object oriented computer processing, comprising the steps of:
    (a) compiling object oriented computer code and determining if there are any fixed objects in said object oriented code;
    (b) elevating said fixed objects to be static class variables;
    (c) removing creation of said fixed objects during run-time computer processing of method calls creating said fixed objects;
    (d) storing said static class variables in a separate root class; creating an object table having a number of entries, marking each of said entries corresponding to one of said static class variables in said root class to be active because it is within said root class; and making said marked entries in said object table to be prevented from participating in a garbage collection process thereby retaining the values of said static class variables.

11. The method of claim 10, wherein said object oriented source code is Java source code.

12. An apparatus for object oriented computing, comprising:
    (a) means for compiling object oriented source code;
    (b) means for determining if any objects in said source code have constant values;
    (c) means for elevating said objects having constant values to a separate root class; and
    (d) means for removing creation of said objects during run-time of the source code; and
    (e) means for indicating said objects in said root class are prevented from participating in a garbage collection process during execution of said source code.

13. The apparatus of claim 12, wherein said indicating means further comprises:
    (a) means for storing said objects in said root class in an immune object table separate from an object table having variable objects.

14. The apparatus of claim 12, wherein said indicating means further comprises:
    (a) means for fixedly marking said objects in an object table to be immune from garbage collection.

* * * * *